(12) United States Patent
Glauning et al.

(10) Patent No.: US 7,597,993 B2
(45) Date of Patent: Oct. 6, 2009

(54) BATTERY PACK COMPRISING HEAT-DIFFUSING MEANS

(75) Inventors: Rainer Glauning, Aichtal-Groetzingen (DE); Stephan Keller, Holzgerlingen (DE); Marcin Rejman, Waiblingen (DE); Wolf Matthias, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 222 days.

(21) Appl. No.: 10/560,057

(22) PCT Filed: Jun. 25, 2004

(86) PCT No.: PCT/DE2004/001348

§ 371 (c)(1),
(2), (4) Date: Dec. 8, 2005

(87) PCT Pub. No.: WO2005/027241

PCT Pub. Date: Mar. 24, 2005

(65) Prior Publication Data

US 2006/0141347 A1    Jun. 29, 2006

(30) Foreign Application Priority Data

Aug. 22, 2003 (DE) .............................. 103 38 654

(51) Int. Cl.
*H01M 2/10* (2006.01)
*H01M 10/50* (2006.01)
*H01M 6/42* (2006.01)

(52) U.S. Cl. ............... 429/120; 429/96; 429/97; 429/98; 429/99; 429/100; 429/156

(58) Field of Classification Search ........... 429/96–100, 429/120, 156
See application file for complete search history.

(56) References Cited

U.S. PATENT DOCUMENTS

| 4,489,792 | A  |   | 12/1984 | Fahim et al. |
|-----------|----|---|---------|--------------|
| 5,511,912 | A  |   | 4/1996  | Ellerbrock |
| 6,004,689 | A  | * | 12/1999 | Walker et al. ............. 429/53 |
| 6,428,925 | B1 | * | 8/2002  | Takeno et al. ............. 429/163 |
| 6,566,005 | B1 | * | 5/2003  | Shimma et al. ............ 429/148 |

FOREIGN PATENT DOCUMENTS

| CN | 1267093   | 9/2000  |
| DE | 2638862   | 3/1978  |
| DE | 600 14 474 | 3/2006 |
| EP | 0940864   | 9/1999  |
| EP | 1035599   | 9/2000  |
| GB | 2 402 097 | 12/2004 |

* cited by examiner

*Primary Examiner*—Mark Ruthkosky
*Assistant Examiner*—Karie O'Neill
(74) *Attorney, Agent, or Firm*—Michael J. Striker

(57) ABSTRACT

A pronounced heat-diffusing action for a battery pack, which has a plurality of battery cells (2) located in a housing (1), is created by shaping the wall of the housing (1) surrounding the battery cells (2) such that this wall forms at least one duct (3, 4) for a heat-diffusing medium, which duct is closed off from the interior of the housing (1).

5 Claims, 1 Drawing Sheet

# BATTERY PACK COMPRISING HEAT-DIFFUSING MEANS

CROSS-REFERENCE TO A RELATED APPLICATION

The invention described and claimed hereinbelow is also described in German Patent Application DE 10338654.8 filed on Aug. 22, 2003. This German Patent Application, whose subject matter is incorporated here by reference, provides the basis for a claim of priority of invention under 35 U.S.C. 119(a)-(d).

BACKGROUND OF THE INVENTION

The present invention relates to a battery pack comprising heat-diffusing means from a plurality of battery cells located in a housing.

Rechargeable battery packs are used for operating power tools, for instance. Both during the operation of a battery pack, or in other words during its discharging process, and in the charging process, the currents flowing through the battery cells cause severe heating up of the battery cells. So that in the charging process the temperature of the battery cells will not exceed a maximum allowable threshold—which would lead to destruction of the battery cells—the charging current must be reduced, with the consequence that the charging time for the battery pack is lengthened. If a higher charging current and accordingly a shorter charging time for the battery pack are to be attained, excessive heating of the battery pack must be avoided. In the prior art, measures are therefore taken to diffuse heat of the battery cells from the battery pack. For instance, in European Patent Disclosure EP 940 864 B1 , a ventilation system for the battery pack is provided for this purpose; it allows air to flow through the interior of the housing of the battery pack. To that end, air inlet and air outlet openings are provided in the battery pack housing. A disadvantage is that with the flow of air through the housing of the battery pack, dirt particles can also get into the interior of the battery pack. Soiling in the interior of the battery pack, however, can change heat transfers among battery cells and can also impair the electrical function of the battery pack. The parts located in the interior of the battery pack form a high air resistance, which impairs the effectiveness of the heat diffusion.

SUMMARY OF THE INVENTION

The object of the invention is to disclose a battery pack with heat-diffusing means, which have the greatest possible heat-diffusing action and moreover do not impair the function of the battery pack.

This object is attained in that the wall of the housing surrounding the battery cells is shaped such that it forms at least one duct, which is closed off from the interior of the housing, for a heat-diffusing medium. According to the invention, the heat-diffusing medium is not carried through the interior of the battery pack housing. This prevents dirt from getting into the interior of the battery pack and being able to impair its electrical function. Moreover, the ducts, which are partitioned off from the interior of the battery pack, form only a very slight flow resistance to the heat-diffusing medium flooding through, and the result is a strong cooling action.

The heat diffusion can be optimized in that the at least one duct is shaped such that its wall rests in form-locking fashion against the battery cells adjacent to it. An especially high heat diffusion becomes possible because the wall regions that form the at least one duct at least partly comprise a heat-conducting material.

It is expedient for the wall regions of the at least one duct that comprise a heat-conducting material to be recessed so far from the outer wall regions of the housing that contact with the heat-conducting material by a user is prevented.

The invention is described in further detail in terms of a plurality of exemplary embodiments shown in the drawing.

DESCRIPTION OF THE PREFERRED EMBODIMENTS

Figure 1:
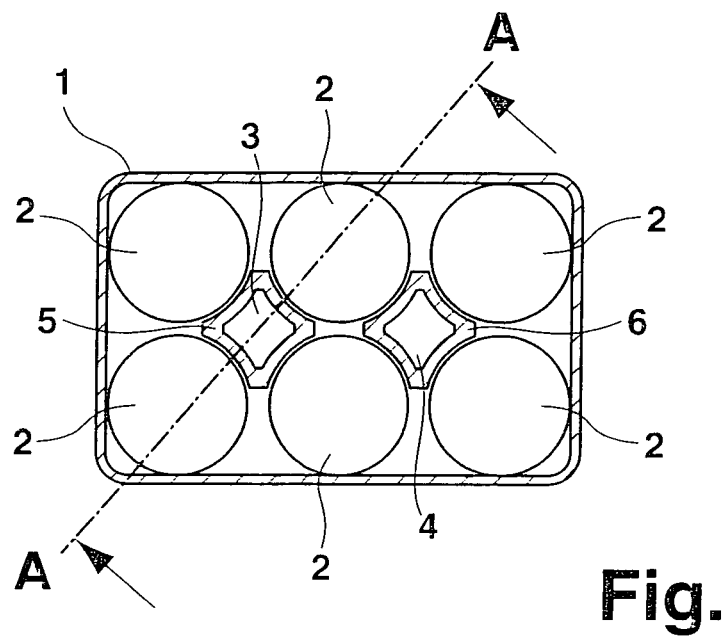
FIG. 1, a plan view on a battery pack with battery cells located in it.

FIG. 1 shows a plan view on a battery pack, in which a plurality of cylindrical battery cells 2 are located in a housing 1. In a position of the battery pack shown, the longitudinal axes of the cylindrical battery cells 2 extend perpendicular to the plane of the drawing.

In the exemplary embodiment shown in FIG. 1, the housing 1 is provided with two ducts 3 and 4, through which a heat-diffusing medium, such as air, can be passed. It is also possible for only one duct or for more than two ducts to be provided. The ducts 3 and 4 are formed by suitable shaping of the housing 1 of the battery pack such that they are completely closed off from the interior of the housing 1. Thus a heat-diffusing medium passed through the ducts 3 and 4 cannot get into the interior of the battery pack, and consequently no dirt particles can get into the housing along with the heat-diffusing medium. The smooth wall of the ducts 3 and 4 assures a fluidically favorable guidance of the heat-diffusing medium, which leads to a very good cooling action. The transporting of the heat-diffusing medium can be done by natural convection, or by means of convection reinforced with a blower. Such a blower may for instance be a component of the battery pack or of the charger for the battery pack, or of the machine into which the battery pack is inserted.

Figure 2:
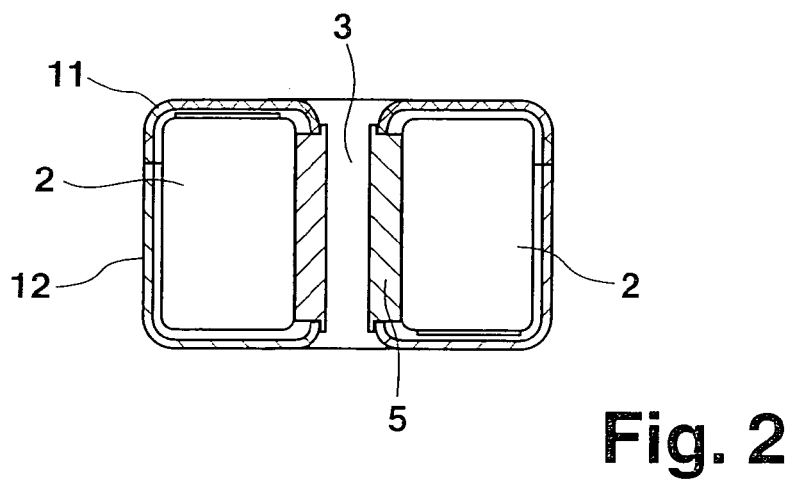
FIG. 2, a cross section A-A through the battery pack, in which the duct for the heat-diffusing medium is a separate part inserted into the housing.

As the cross section A-A through the battery pack in FIG. 2 also shows, the ducts 3, 4 extend parallel to the longitudinal axes of the cylindrical battery cells 2. This location of the ducts 3 and 4 is especially favorable because the ducts 3 and 4 are located in the nips between the individual battery cells 2. This has the advantage that the walls 5 and 6 of the ducts 3 and 4 can be brought into heat-conducting contact with the adjacent battery cells 2 over a large area. However, the ducts may also be located transversely or diagonally to the battery cells and may also have cured courses. As can be seen particularly from FIG. 1, the walls 5 and 6 of the ducts 3 and 4 are preferably shaped such that they rest by form-locking on the battery cells 2 adjacent to them. If the walls 5 and 6 of the ducts 3 and 4 comprise an especially highly heat-conducting material (such as metal), the heat diffusion action is especially pronounced.

In the exemplary embodiment shown in FIG. 2, the housing 1 of the battery pack comprises an upper housing shell 11 and a lower housing shell 12. The walls 5 and 6 of the ducts 3 and 4, respectively, are formed by respective parts 5, 6 inserted between the two housing shells 11 and 12. As the exemplary embodiment in FIG. 2 shows, these housing parts 5, 6 are recessed relative to the upper housing shell 11 and lower housing shell 12, so that contact by a user with the especially highly heat-conducting material of the walls 5 and 6 is prevented.

Figure 3:
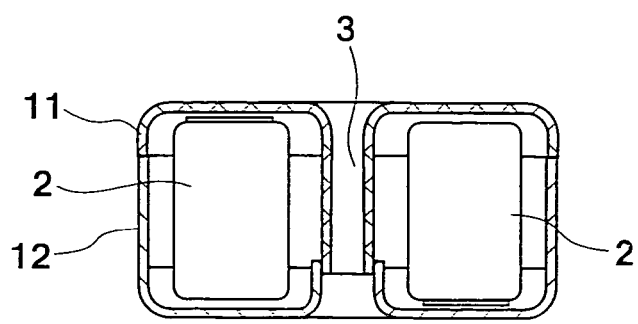
FIG. 3, a cross section through a battery pack in which the duct is formed by two housing parts.

In a further exemplary embodiment, shown in FIG. 3, the walls of the ducts 3, 4 are formed directly onto the housing shells 11, 12.

The invention claimed is:

1. A battery pack, comprising a housing forming only one compartment; a plurality of battery cells located in said one compartment of said housing and having longitudinal axes; and heat-diffusing means for diffusing heat from said battery cells, said heat diffusing means including a wall of said housing which is peripherally adjacent to said battery cells from outside of said battery cells and is shaped so that it forms at least one peripherally closed and uninterrupted duct which extends parallel to said longitudinal axes of said battery cells from one axial side to another side of said housing, is open outside at said one and another axial sides, and is closed off in its entirety from said one compartment of said housing in which said battery cells are located, for passing a heat-diffusing medium, wherein said at least one duct is located in a nip between individual ones of said battery cells and has wall regions that rest in form-locking fashion against said battery cells that are located adjacent to said wall regions.

2. A battery pack as defined in claim 1, wherein said wall regions of said at least one duct include at least partly a heat-conducting material.

3. A battery pack as defined in claim 2, wherein said wall regions of said at least one duct that include said heat-conducting material are recessed so far from outer wall regions of said housing that contact with said heat-conducting material by a user is prevented.

4. A battery pack, comprising a housing forming only one compartment; a plurality of battery cells located in said one compartment of said housing and having longitudinal axes; and heat-diffusing means for diffusing heat from said battery cells, said heat diffusing means including a wall of said housing which is peripherally adjacent to said battery cells from outside of said battery cells and is shaped so that it forms at least one peripherally closed and uninterrupted duct which is located between individual ones of said battery cells from one axial side to another axial side of said housing, extends parallel to said longitudinal axes of said battery cells, is open outside at said one and another axial sides, and is closed off in its entirety from the said one compartment of said housing in which said battery cells are located, for passing of a heat-diffusing medium from one axial side to another axial side of said housing between said battery cells, wherein said at least one duct is located in a nip between individual ones of said battery cells and has wall regions that rest in form-locking fashion against said battery cells that are located adjacent to said wall regions.

5. A battery pack, comprising a housing forming only one compartment; a plurality of battery cells located in said one compartment of said housing and having longitudinal axes; and heat-diffusing means for diffusing heat from said battery cells, said heat diffusing means including a wall of said housing which is peripherally adjacent to said battery cells from outside of said battery cells and is shaped so that it forms at least one peripherally closed and uninterrupted duct which is located between a plurality of individual ones of said battery cells, extends parallel to said longitudinal axes of said battery cells, is open outside at said one and another axial sides, and is closed off in its entirety from said one opening of said housing in which said battery cells are located, for passing of a heat-diffusing medium from one axial side to another axial side of said housing between said battery cells, wherein said at least one duct is located in a nip between individual ones of said battery cells and has wall regions that rest in form-locking fashion against said battery cells that are located adjacent to said wall regions.

\* \* \* \* \*